Nov. 15, 1932.                R. L. HUFFMAN                1,888,130
NONFREEZING VALVE
Filed Dec. 23, 1930
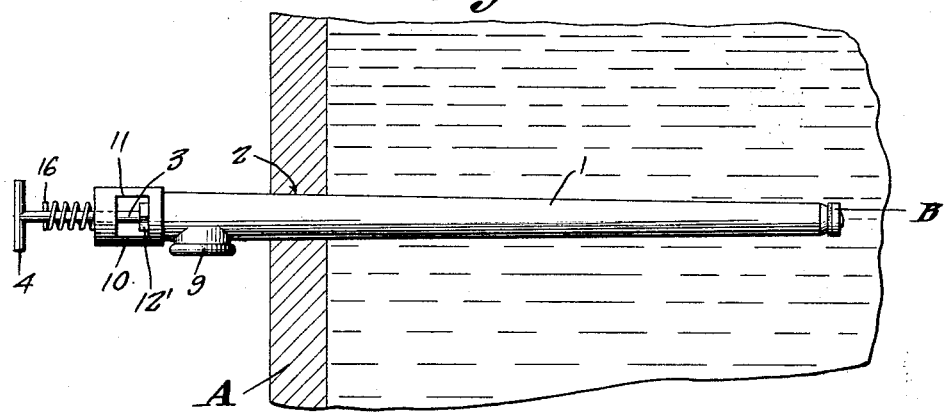
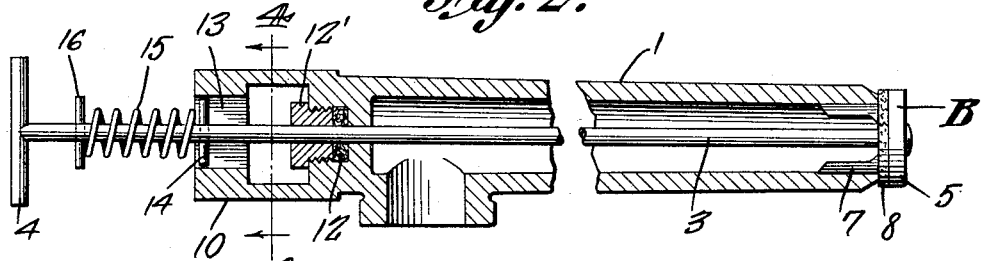
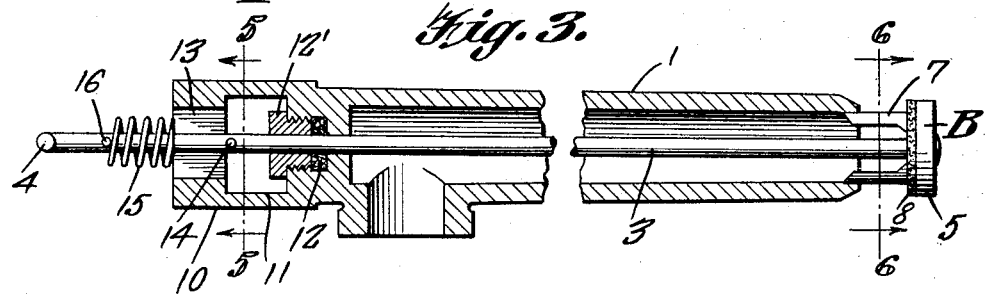
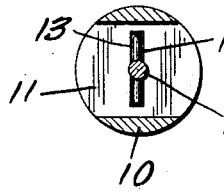 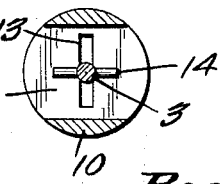 
Ross L. Huffman,
INVENTOR
BY Victor J. Evans
ATTORNEY Patented Nov. 15, 1932

1,888,130

UNITED STATES PATENT OFFICE

ROSS L. HUFFMAN, OF LONGTON, KANSAS

NONFREEZING VALVE

Application filed December 23, 1930. Serial No. 504,401.

This invention relates to a non-freezing valve for controlling the discharge of a tank or the like, the general object of the invention being to provide a faucet having its body of considerable length so that the inner end of the body will extend a great distance into the tank with a valve for closing said inner end and means for operating the valve from the front or outer end of the faucet, thus preventing the valve from freezing.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is a fragmentary sectional view of a tank, showing the invention in use.

Figure 2 is a sectional view through the faucet, showing the same in closed position.

Figure 3 is a similar view showing the valve of the faucet in open position.

Figure 4 is a section on line 4—4 of Figure 2.

Figure 5 is a section on line 5—5 of Figure 3.

Figure 6 is a section on line 6—6 of Figure 3.

In these views, the numeral 1 indicates the body of the faucet, which is of considerable length and which tapers from its inner end to its outer end so that the faucet can be driven into a hole 2 formed in the tank A or other container, whereby leakage between the faucet and the walls of the hole is prevented. The body of the faucet is of such a length that its inner end is arranged beyond the freezing point and said inner end forms a seat for a valve B, the stem 3 of which passes entirely through the body of the faucet and has a handle 4 at its outer end.

The valve comprises a disk 5 having the wings 7 thereon which act to guide the valve in its movement and a ring 8 of resilient material or the like is placed on the disk and engages the inner end of the body when the valve is closed to make a watertight joint between the parts.

The outer portion of the faucet is provided with the usual discharge part 9 and the extremity of this outer portion is enlarged, as at 10, with an opening 11 passing transversely through the enlargement. A packing 12 for the stem 1 is arranged in the enlargement and the plug or gland 12' is accessible through the opening 11. A slot 13 is formed in the outer end of the enlargement and communicates with the opening 11 and a pin 14 on the stem is adapted to pass through the slot when the stem is turned to place the pin in alignment with the slot. After the pin has passed through the slot, on the opening movement of the valve, the stem is turned to place the pin 14 across the slot, as shown in Figure 5, so that the valve will be held in open position. A spring 15 is placed on the outer part of the stem and bears against the outer end of the enlargement 10 and the pin 16 passing through the stem. This spring tends to hold the valve in closed position.

From the foregoing it will be seen that I have provided means whereby the valve of the faucet is located a considerable distance from the outer wall of the tank so as to prevent the valve from freezing, with means whereby the valve can be moved to open and closed position from the outer end of the faucet.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A non-freezing valve comprising an elongated body adapted to extend into a container and having a bore extending through the inner end thereof and through one side of the body adjacent the outer end, an enlargement formed on the outer end of the body and having a transverse opening and a slot in communication with said opening and extending through the end of the enlargement, a valve stem extending through the body and enlargement, a packing means between the enlargement and the stem accessible through the opening, a valve on the inner end of the stem to control passage of fluid through the body, a handle on the outer end of the stem, tension means between the enlargement and stem to normally seat the valve, a pin on the stem and operating in the slot and adapted to be positioned in said opening transversely of said slot and against the enlargement to hold the valve unseated, and guides on the valve and extending into the body during all positions of said valve.

In testimony whereof I affix my signature.

ROSS L. HUFFMAN.